US008612432B2

(12) United States Patent
Kenthapadi et al.

(10) Patent No.: US 8,612,432 B2
(45) Date of Patent: Dec. 17, 2013

(54) DETERMINING QUERY INTENT

(75) Inventors: Krishnaram N. G. Kenthapadi, Mountain View, CA (US); Panayiotis Tsaparas, San Francisco, CA (US); Sreenivas Gollapudi, Cupertino, CA (US); Rakesh Agrawal, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 405 days.

(21) Appl. No.: 12/816,389

(22) Filed: Jun. 16, 2010

(65) Prior Publication Data

US 2011/0314012 A1 Dec. 22, 2011

(51) Int. Cl.
G06F 7/00 (2006.01)
G06F 17/30 (2006.01)
G06F 15/18 (2006.01)

(52) U.S. Cl.
USPC .......................................... 707/731; 706/14

(58) Field of Classification Search
None
See application file for complete search history.

(56) References Cited

U.S. PATENT DOCUMENTS

| 6,901,411 | B2 * | 5/2005 | Li et al. ................................... 1/1 |
| 8,407,214 | B2 * | 3/2013 | Li et al. .......................... 707/726 |
| 2002/0107853 | A1 * | 8/2002 | Hofmann et al. .................. 707/7 |
| 2003/0195877 | A1 * | 10/2003 | Ford et al. ........................... 707/3 |
| 2004/0260677 | A1 | 12/2004 | Malpani et al. |
| 2006/0122979 | A1 | 6/2006 | Kapur et al. |
| 2007/0078822 | A1 * | 4/2007 | Cucerzan et al. ................. 707/3 |
| 2007/0208730 | A1 | 9/2007 | Agichtein et al. |
| 2008/0183685 | A1 | 7/2008 | He et al. |
| 2009/0043749 | A1 | 2/2009 | Garg et al. |
| 2009/0313286 | A1 | 12/2009 | Mishra et al. |

FOREIGN PATENT DOCUMENTS

WO 2007113546 A1 10/2007

OTHER PUBLICATIONS

Andreas, Cluster Visualization in Unsupervised Neural Networks Sep. 10, 1998, www.ifs.tuwien.ac.at, http://www.ifs.tuwien.ac.at/ifs/research/pub__html/rau__masterth96/thesis.html, node34, node36.*
Yin et al., Bayesian learning for self-organising maps Feb. 13, 1997, Electronics Letters, vol. 33 No. 4, pp. 304-305.*
Kohonen, Self-Organized Formation of Topologically Correct Feature Maps, 1982, Biological Cybernetics, Springer-Verlag, pp. 59-69.*
Duda et al, Pattern Classification 2001, $2^{nd}$ ed, pp. 1-17, 576-579.*

(Continued)

*Primary Examiner* — Jason Liao
(74) *Attorney, Agent, or Firm* — Microsoft Corporation

(57) ABSTRACT

A tree structure has a node associated with each category of a hierarchy of item categories. Child nodes of the tree are associated with sub-categories of the categories associated with parent nodes. Training data including received queries and indicators of a selected item category for each received query is combined with the tree structure by associating each query with the node corresponding to the selected category of the query. When a query is received, a classifier is applied to the nodes to generate a probability that the query is intended to match an item of the category associated with the node. The classifier is applied until the probability is below a threshold. One or more categories associated with the nodes that are closest to the intent of the received query are selected and indicators of items of those categories that match the received query are output.

20 Claims, 5 Drawing Sheets

(56) References Cited

OTHER PUBLICATIONS

Xiang, et al., "Context-Aware Ranking in Web Search", Retrieved at << http://www.cs.sfu.ca/~jpei/publications/context-aware%20ranking%20SIGIR%202010.pdf >>, To appear in SIGIR'10, Jul. 19-23, 2010, pp. 8.

Ganti, et al., "Precomputing Search Features for Fast and Accurate Query Classification", Retrieved at << http://www.wsdm-conference.org/2010/proceedings/docs/p61.pdf >>, Web Search and Web Data Mining, Proceedings of the third ACM international conference on Web search and data mining, Feb. 4-6, 2010, pp. 61-70.

Fuxman, et al., "Improving classification accuracy using automatically extracted training data", Retrieved at << http://research.microsoft.com/pubs/80763/CommerceIntent_KDD09.pdf >>, International Conference on Knowledge Discovery and Data Mining, Proceedings of the 15th ACM SIGKDD international conference on Knowledge discovery and data mining, Jun. 28-Jul. 1, 2009, pp. 9.

Diemert, et al., "Unsupervised query categorization using automatically-built concept graphs", Retrieved at << http://www2009.org/proceedings/pdf/p461.pdf >>, International World Wide Web Conference, Proceedings of the 18th international conference on World wide web, Apr. 20-24, 2009, pp. 461-470.

Beitzel, et al., "Automatic web query classification using labeled and unlabeled training data", Retrieved at << http://www.ir.iit.edu/~abdur/publications/p294-beitzel.pdf >>, Annual ACM Conference on Research and Development in Information Retrieval, Proceedings of the 28th annual international ACM SIGIR conference on Research and development in information retrieval, Aug. 15-19, 2005, pp. 2.

Broder, et al., "Robust classification of rare queries using web knowledge", Retrieved at << http://citeseerx.ist.psu.edu/viewdoc/download?doi=10.1.1.88.7387&rep=rep1&type=pdf >>, Annual ACM Conference on Research and Development in Information Retrieval, Proceedings of the 30th annual international ACM SIGIR conference on Research and development in information retrieval, Jul. 23-27, 2007, pp. 8.

Kang, et al., "Query type classification for web document retrieval", Retrieved at << http://citeseerx.ist.psu.edu/viewdoc/download?doi=10.1.1.58.5400&rep=rep1&type=pdf >>, Annual ACM Conference on Research and Development in Information Retrieval, Proceedings of the 26th annual international ACM SIGIR conference on Research and development in informaion retrieval, Jul. 28-Aug. 1, 2003, pp. 64-71.

Shen, et al., "Query enrichment for web-query classification", Retrieved at << http://research.microsoft.com/pubs/79487/Query%20Enrichment%20for%20Web-query%20Classification.Shen.HKUST.TOIS.2006.Paper.pdf >>, ACM Transactions on Information Systems (TOIS), vol. 24, No. 3, Jul. 2006, pp. 1-33.

Vogel, et al., "Classifying search engine queries using the web as background knowledge", Retrieved at << http://www.sigkdd.org/explorations/issues/7-2-2005-12/KDDCUP2005Report_Scheffer.pdf >>, ACM SIGKDD Explorations Newsletter, vol. 7, No. 2, Dec. 2005, pp. 117-122.

Dumais, et al., "Hierarchical classification of Web content", Retrieved at << http://research.microsoft.com/en-us/um/people/sdumais/sigir00.pdf >>, Annual ACM Conference on Research and Development in Information Retrieval, Proceedings of the 23rd annual international ACM SIGIR conference on Research and development in information retrieval, Jul. 24-28, 2000, pp. 9.

Koller, et al., "Hierarchically Classifying Documents Using Very Few Words", Retrieved at << http://robotics.stanford.edu/users/sahami/papers-dir/ml97-hier.pdf >>, Proceedings of the Fourteenth International Conference on Machine Learning, Jul. 8-12, 1997, pp. 9.

Granitzer, Michael, "Hierarchical Text Classification using Methods from Machine Learning", Retrieved at << http://citeseerx.ist.psu.edu/viewdoc/download?doi=10.1.1.92.6162&rep=rep1&type=pdf >>, Oct. 27, 2003, pp. 104.

Hofmann, et al., "Learning with taxonomies: Classifying documents and words", Retrieved at << http://citeseerx.ist.psu.edu/viewdoc/download?doi=10.1.1.138.4875&rep=rep1&type=pdf >>, Proceedings of the 22nd international conference on Machine learning table of contents, NIPS Workshop on Syntax, Semantics, and Statistics, 2003, pp. 8.

McCallum, et al., "Improving Text Classification by Shrinkage in a Hierarchy of Classes", Retrieved at << http://ai.stanford.edu/~ang//papers/icml98-hier.pdf >>, Proceedings of the Fifteenth International Conference on Machine Learning, Jul. 24-27, 1998, pp. 9.

Ruiz, et al., "Hierarchical Text Categorization Using Neural Networks", Retrieved at << http://citeseerx.ist.psu.edu/viewdoc/download?doi=10.1.1.1.6484&rep=rep1&type=pdf >>, Information Retrieval, vol. 5, No. 1, Jan. 2002, pp. 1-40.

Cesa-Bianchi, et al., "Regret Bounds for Hierarchical Classification with Linear-Threshold Functions", Retrieved at << http://citeseerx.ist.psu.edu/viewdoc/download?doi=10.1.1.110.6757&rep=rep1&type=pdf >>, Learning Theory, 17th Annual Conference on Learning Theory, COLT, Jul. 1-4, 2004, pp. 15.

Agrawal, et al., "Generating labels from clicks", Retrieved at << http://wsdm2009.org/papers/p172-agrawal.pdf >>, Web Search and Web Data Mining, Proceedings of the Second ACM International Conference on Web Search and Data Mining, Feb. 9-12, 2009, pp. 10.

* cited by examiner

DETERMINING QUERY INTENT

BACKGROUND

Users typically search for items such as consumer products and other goods and services on the Internet. Users may submit their query by entering a query into a field of a search engine or a field provided by a merchant website. However, because of ambiguities inherent in language, the intent of the query, i.e. what the user was actually searching for, may not be clear based on the query.

For example, a user may provide the query "trimmer" to an online merchant. The query "trimmer" may apply to variety of product types such as hair trimmers, nail trimmers, beard trimmers, lawn trimmers, and hedge trimmers. Because users may become frustrated if provided with incorrect results, the intent of a query (e.g., such as a product category) may be determined before providing results based on the query.

SUMMARY

In an implementation, a tree data structure is generated that has a node associated with each item category of a hierarchy of item categories. Child nodes of the tree are associated with sub-categories of the categories associated with their parent nodes. Training data, including received queries and indicators of a selected item category for each received query, is combined with the tree data structure by associating each query with the node corresponding to the selected item category of the query. When a query is later received, a classifier is applied to the nodes of the tree data structure to generate a probability that the received query is intended to match an item of the item category associated with the node. The classifier is applied until the generated probability is below a threshold. The item category associated with the nodes whose generated probability is the greatest is selected as the intended item category, and indicators of items of the intended item category that match the received query are provided to the user who provided the received query.

In an implementation, a plurality of nodes is received by a computing device, e.g. through a network. Each node is associated with an item category and each node is further associated with a plurality of queries and a count for each associated query. A threshold probability is received by the computing device, e.g. through the network. Alternatively, a threshold probability may also be automatically determined by the computing device responsive to an input value. A query is received by the computing device, and a classifier is received by the computing device. The classifier, when applied to a node using the received query, generates a probability that the received query is intended for an item category associated with the node. The classifier is recursively applied to the nodes using the received query until a generated probability for a node is below the threshold probability, resulting in a list of item categories and a generated probability for each item category in the list of item categories. The item categories are ranked based on how likely they are to match an intent of the received query. The item categories are provided in ranked order by the computing device.

Implementations may include some or all of the following features. A highest ranked item category may be determined from the ranked item categories. One or more items responsive to the received query that are associated with the highest ranked item category may be determined. Indicators of the determined one or more items may be provided. A subset of the ranked item categories may be determined. One or more items responsive to the received query that are associated with the item categories of the subset of ranked item categories may be determined. Indicators of the determined one or more items may be provided. The indicators of the determined one or more items may be provided grouped by the item categories associated with their indicated items. The classifier may be a Bayesian classifier. The classifier may generate a probability that the received query is intended for an item category associated with the node by determining the count associated with the node for the received query and generating the probability using the determined count. The items may be consumer products.

In an implementation, training data comprising a plurality of item categories is received by a computing device, e.g. through a network. Each item category has one or more associated queries and a count associated with each of the one or more queries. A plurality of nodes comprising a node for each item category is received by the computing device. Each node is either a child of another node, a parent of another node, or both. For each of the nodes, the count for each query associated with the item category of the node is associated with the node by the computing device. For each of the nodes, the count for each query associated with the item category of the node is associated with one or more nodes that are parents of the node.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
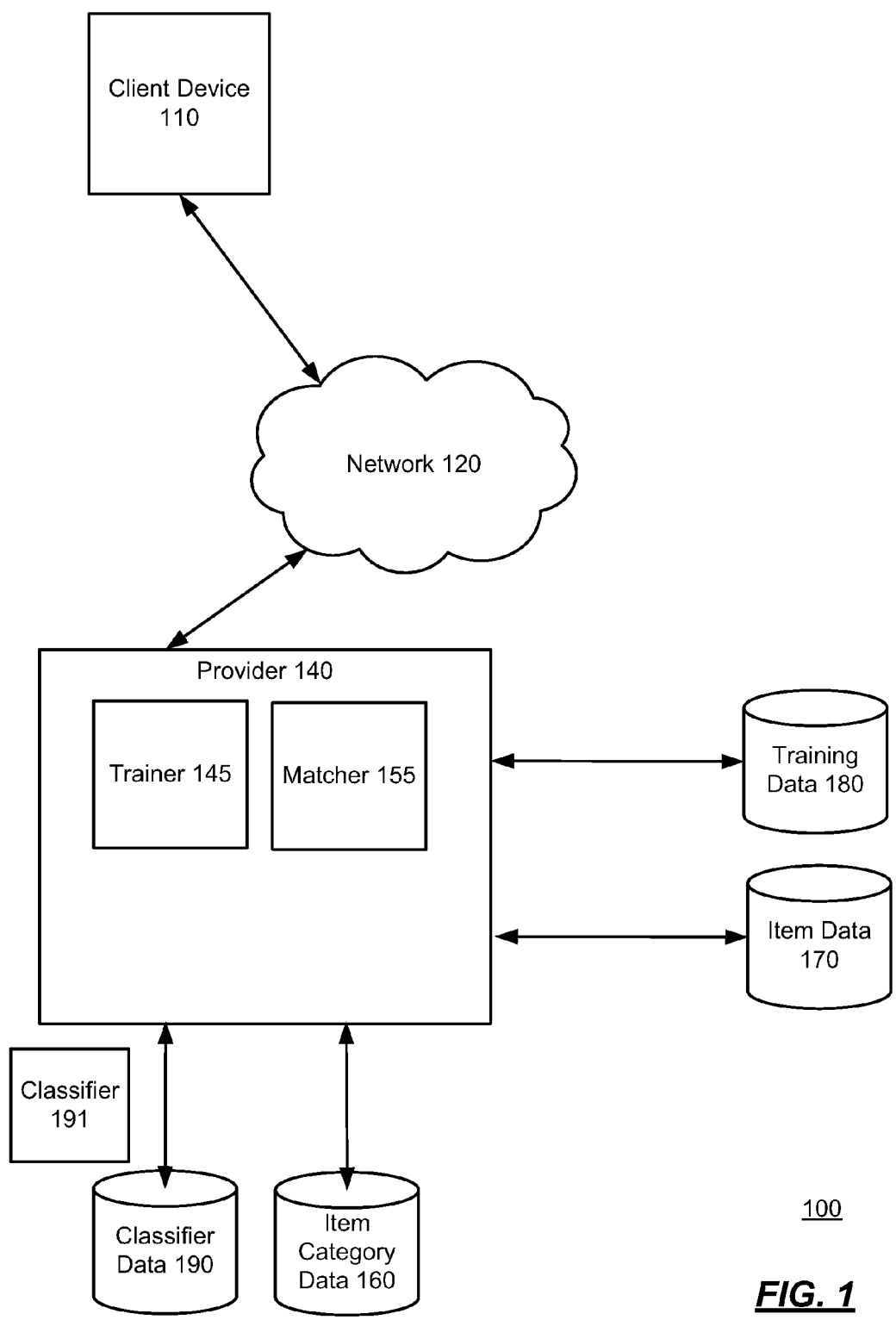
FIG. 1 is an illustration of an example environment for determining an intended category for a received query.

FIG. 1 is an illustration of an example environment 100 for determining an intended category for a received query. A client device 110 may communicate with a provider 140 through a network 120. The client device 110 may be configured to communicate with the provider 140 to access, receive, retrieve, and display content and other information such as webpages. The network 120 may be a variety of network types including the public switched telephone network (PSTN), a cellular telephone network, and a packet switched network (e.g., the Internet). Although only one provider 140 is shown in FIG. 1, it is contemplated that the client device 110 may be configured to communicate with more than one provider 140 through the network 120.

In some implementations, the client device 110 may include a desktop personal computer (PC), workstation, laptop, personal digital assistant (PDA), cell phone, or any WAP-enabled device or any other computing device capable of interfacing directly or indirectly with the network 120. The client device 110 may be implemented using one or more computing devices such as the computing system 500 described with respect to FIG. 5. The client device 110 may run an HTTP client, e.g., a browsing program, such as MICROSOFT INTERNET EXPLORER or other browser, or a WAP-enabled browser in the case of a cell phone, PDA, or other wireless device, or the like, allowing a user of the client device 110 to access, process, and view information and pages available to it from the provider 140.

In some implementations, the provider 140 may receive queries and may provide indicators of one or more items that are responsive to the query. The items may be a variety of products and/or services (i.e., consumer products) and may include books, consumer electronics, restaurant listings, and airplane schedules, for example. The provider 140 may be a search engine or may be a merchant or other type of provider. The provider 140 may be implemented using one or more computing devices such as the computing system 500 described with respect to FIG. 5.

The provider 140 may store and access information about the items in what is referred to as item data 170. The item data 170 may include information or other data about a variety of items. In addition, each item may be organized into one or more item categories in the item data 170. The item categories may refer to qualities, properties, and/or characteristics of the items. For example, a digital camera item may be associated with the item category "Consumer Products/Electronics/Digital Cameras". In some implementations, the categories are hierarchical. Continuing the example above, the item category "Consumer Products/Electronics/Digital Cameras" is a subset of the category "Consumer Products/Electronics", which is a subset of the category "Consumer Products". The item data 170 may be implemented as structured data, for example.

The provider 140 may further store and access item category data 160. The item category data 160 may include a data structure representing the hierarchy of item categories. In some implementations, the hierarchy of item categories may be stored in the item category data 160 as a tree with each node of the tree associated with a particular item category. Each node of the tree may be a parent node, a child node, or both. A child node is associated with a sub-category of the item category of its parent node. Thus, the outermost nodes of the tree are associated with the most specific item categories and the internal nodes of the tree are associated with broader item categories. The root or topmost node in the tree may be associated with the broadest item category. Other types of data structures may also be used.

Figure 2:
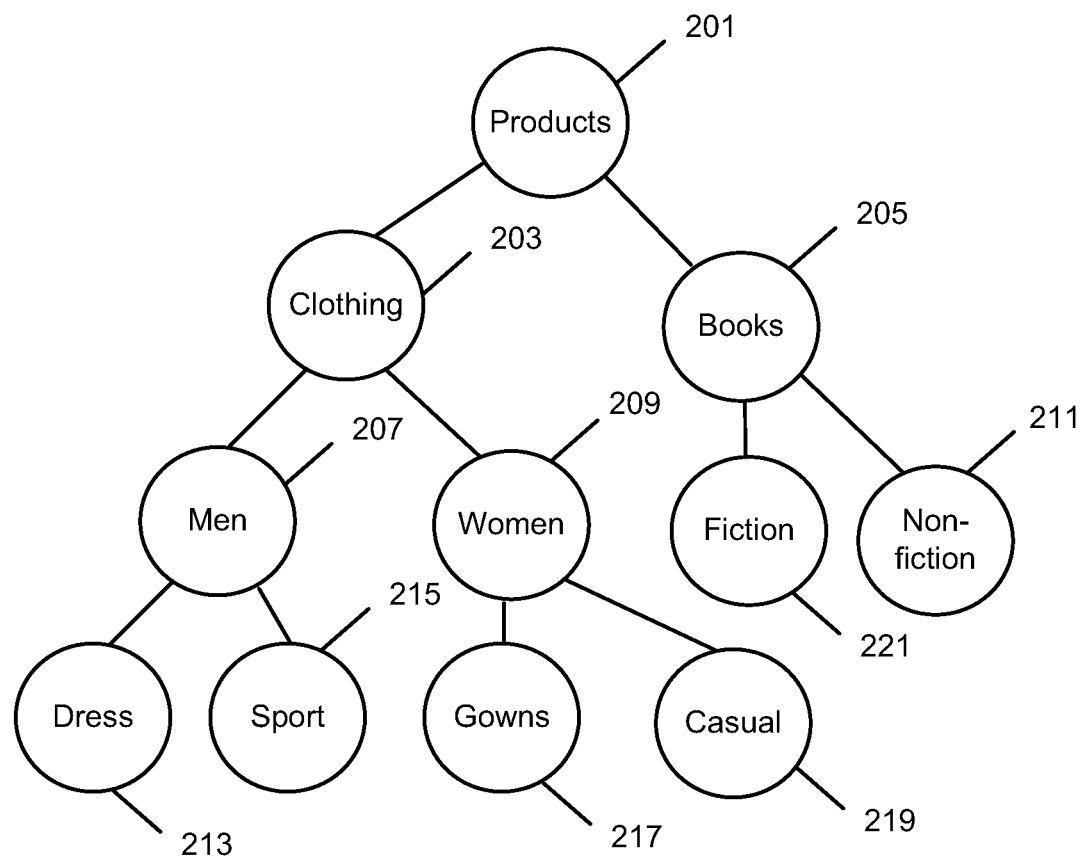
FIG. 2 is an illustration of example item category data.

For example, such an example tree data structure is illustrated with respect to the item category data 160 shown in FIG. 2. As shown, the item category data 160 includes nodes 201, 203, 205, 207, 209, 211, 213, 215, 217, 219, and 221. The node 201 is the root node and is associated with the broadest item category "products". Its children are the nodes 203 and 205 which are associated with the item categories "products/clothing" and "products/books" respectively. The leaf nodes 213, 215, 217, 219, 221, and 211 are each associated with the more specific categories that include "products/clothing/men/dress", "products/clothing/men/sport", "products/clothing/women/gowns", "products/clothing/women/casual", "products/books/fiction", and "products/books/non-fiction", respectively.

The provider 140 may further include a trainer 145. The trainer 145 may generate training data 180. The training data 180 may comprise a mapping or association between queries and item categories. The training data 180 may further include a count associated with each query and item category. An example tuple for the category "products/clothing/women/gowns" for a query "wedding dress" that was observed 500 times in the training data 180 is {products/clothing/women/gowns, wedding dress, 500}.

The trainer 145 may incorporate or combine the training data 180 with the item category data 160. The trainer 145 may associate the count and query of each tuple in the training data 180 with the corresponding node in the item category data 160 based on the item category associated with each node and each tuple. Continuing the example described above, the trainer 180 may associate the query "wedding dress" and the count "500" of the tuple {products/clothing/women/gowns, wedding dress, 500} with the node 217 because the node 217 corresponds to the category "products/clothing/women/gowns".

In some implementations, the trainer 145, when associating a query and count of the training data 180 with a node, may further associate the query and count with any parent nodes of the node. Continuing the example described above, the trainer 145 may associate the query "wedding dress" and the count "500" with the nodes 209, 203, and 201. Where a node is already associated with a query, the trainer 145 may add the counts of queries. For example, if the node 209 is associated with the query "wedding dress" with a count of 250, the trainer 145 may add 500 to the existing count, resulting in the query "wedding dress" with a count of 750 associated with the node 209.

The provider 140 may receive a query from a user of the client device 110, and determine one or more intended categories using the combined item category data 160 and training data 180. In some implementations, the provider 140 may determine the one or more intended categories using a classifier 191. One or more classifiers 191 may be stored in the classifier data 190.

In some implementations, a classifier 191 may take the received query and a node of the combined item category data 160 and training data 180 as an input, and output a probability that the query was intended to match an item associated with the item category corresponding to the node. Alternatively, the classifier 191 may return the probability that the query was intended to match an item of the item category corresponding to a child node of the node given that the query was intended to also match an item of the item category corresponding to the node. In some implementations, the classifier 191 may determine the probability by taking the count associated with the node for the received query, and dividing the count by a number representing the total number of queries received in the training data 180. Other methods for calculating the probability may be used such as Bayesian statistics and/or logistical regressions. In some implementations, the classifier is what is known as a "flat classifier" and when applied to the received query at a node, may return the probability that the received query is associated with the child nodes of the applied node.

The provider 140 may recursively apply a classifier 191 to nodes of the combined item category data 160 and training data 180 until a calculated probability for a node is less than a threshold probability. The threshold probability may be selected by a user or an administrator and may be selected based on a trade-off between a desire to provide more specific categories and a desire to not return incorrect results. For example, a low threshold probability may result in the provider 140 reaching nodes corresponding to more specific item categories. However, such item categories may not in fact accurately represent the intention of the query. The threshold probability may also be automatically determined by the computing device responsive to an input value.

The provider 140 may recursively apply the classifier 191 to nodes of the item category data 160 resulting in a list of item categories and associated probabilities output by the classifier 191 for each of the nodes that was above the threshold probability. In some implementations, the provider 140 may then provide the list of categories to a user. For example, the provider 140 may provide the user a list of the matching item categories and the user may select the matching item category that they believe is correct. Alternatively, the provider 140 may rank the item categories based on their closeness to the true intent of the received query. The closeness of categories to the true intent of the received query may be evidenced by the probability output of the classifier, for example.

In addition, rather than provide the determined item categories to the user, the provider 140 may include a comparator or matcher 155 that may determine items that match the received query that are also associated with one or more of the item categories in the list of categories. The matcher 155 may determine items that match the item categories in the list of categories and the received query in the item data 170. In some implementations, the matcher 155 may only match items associated with the highest ranked categories. The matcher 155 may then provide indicators of items associated with the item category that match the received query. The indicators may be URLs (uniform resource locators), for example. Alternatively, the matcher 155 may match items associated with some subset of the highest ranked categories. The matcher 155 may then provide indicators of the matching items grouped by associated item category.

Figure 3:
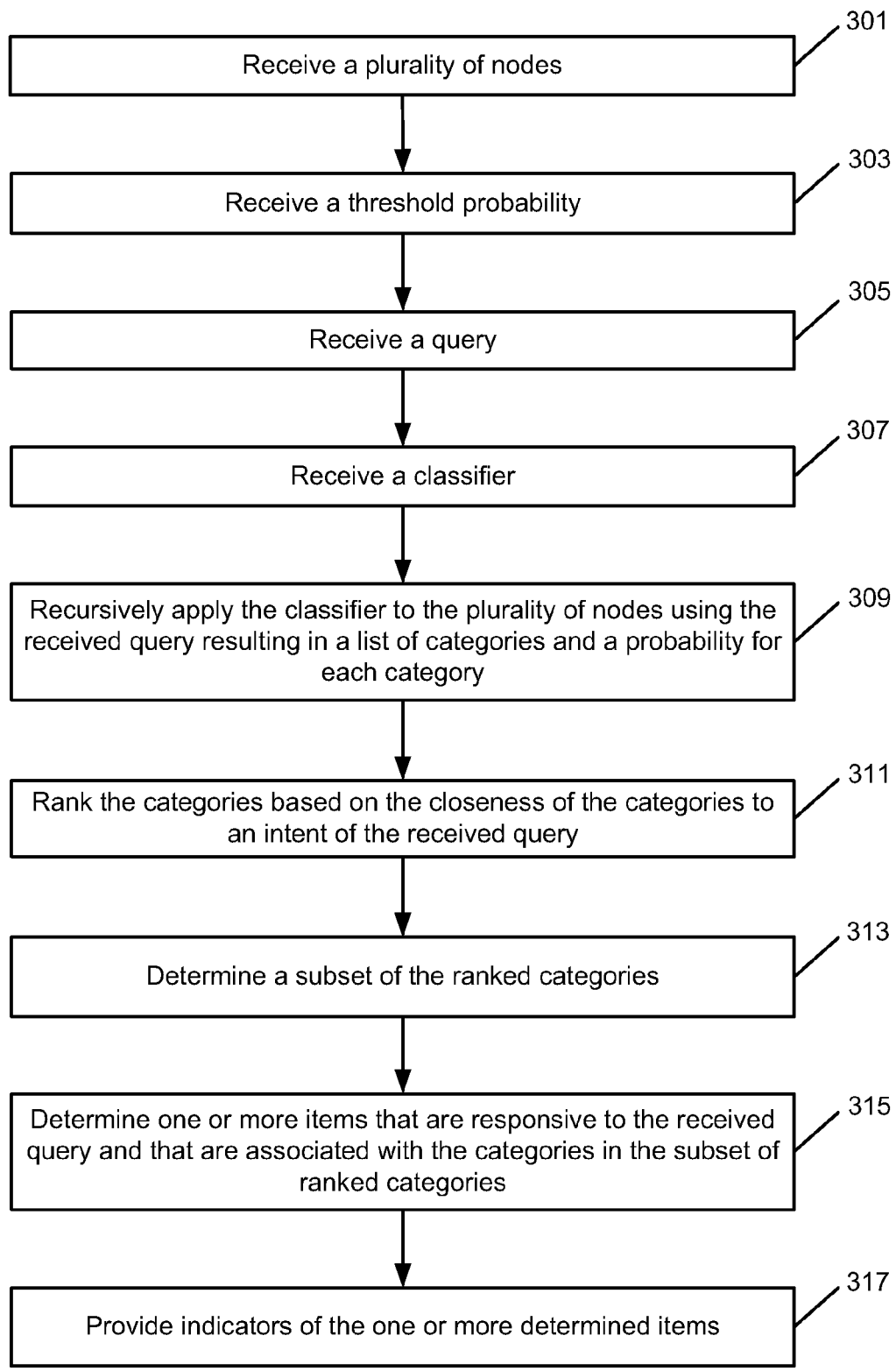
FIG. 3 is an operational flow of an implementation of a method for inferring one or more categories associated with a received query and providing items matching the query from the one or more categories.

FIG. 3 is an operational flow of an implementation of a method 300 for inferring one or more categories associated with a received query and providing items matching the query from the one or more categories. The method 300 may be implemented by the provider 140, for example.

A plurality of nodes is received at 301. The plurality of nodes may be received by the provider 140. Each node may be associated with an item category and a plurality of queries. In addition, each query may be associated with a count that represents that number of times that the query was submitted and resulted in a purchase or selection of an item having the same category as the node. In some implementations, the nodes may have been generated by the trainer 145 of the provider 140 by combining nodes representing a hierarchy of item categories and training data collected over some period of time, for example.

A threshold probability is received at 303. The threshold probability may be received by the provider 140 from a user or an administrator. In some implementations, the threshold probability may also be automatically determined by the computing device responsive to an input value. The threshold probability may represent a minimum probability under which child nodes of the plurality of nodes may no longer be considered by a classifier 191. A low probability threshold may cause a classifier 191 to return very specific categories for a received query, while a high probability threshold may cause the classifier 191 to return more general categories for a received query.

A query is received at 305. The query may be received by the provider 140 from a user of a client device 110. For example, the user may wish to purchase a musical instrument and may submit the query "instrument" into a webpage associated with the provider 140. The provider 140 may then receive the query though the network 120. However, because whether the query "instrument" was intended by the user to match items in item categories such as musical instruments, medical instruments, or other types of instruments, the provider 140 may attempt to determine the item category of the item that the user intended the query to match.

A classifier is received at 307. The classifier 191 may be received by the provider 140 from the classifier data 190. In some implementations, the classifier 191 may output a probability that a received query was intended to match an item associated with the item category corresponding to a node when applied to the node. The node may be part of the plurality of nodes that represent the item categories. Alternatively, the classifier 191 may return the probability that the received query was intended to match a category corresponding to a child node of the node given that the query was intended to also match the node. In some implementations, the classifier 191 may determine the probability for a node by determining the count associated with the node and the received query and dividing the count by a number representing the total number of queries received in the training data 180. Other methods for calculating the probability may be used such as Bayesian statistics and/or logistical regressions.

The classifier is recursively applied to the plurality of nodes resulting in a list of item categories and a probability for each of the item categories in the list at 309. In an implementation, the provider 140 may recursively apply the classifier 191 to the plurality of nodes using the received query until a generated probability for a node is below the threshold probability.

The categories are ranked based on the closeness of the categories to an intent of the received query at 311. The categories may be ranked by the provider 140. The closeness of each category may be evidenced by the probability output by the classifier at the node associated with that category.

A subset of the ranked categories is determined at 313. The subset may be determined by the provider 140. The subset may include some number of the top ranked categories. For example, in some implementations, only the top ranked category may be in the subset. In another implementation, the top five ranked categories may be in the subset. The subset may include any number of categories. The number of categories in the subset may be selected by a user or an administrator. In some implementations, the categories may be ranked to favor more popular categories as evidenced by aggregated user behavior from the search or query log, for example.

One or more items that are responsive to the received query and that are associated with the categories in the subset of ranked categories are determined at 315. The one or more responsive items may be determined by the matcher 155 of the provider 140 by determining items in the item data 180 that match the received query and that are associated with the categories in the subset of ranked categories.

Indicators of the one or more determined items are provided at 317. The indicators may be provided by the provider 140 through the network 120 to the client device 110 of the user that provided the received query. In some implementations, the indicators may be URLs. Graphics, text, or other data associated with the items may also be provided to the user. The identifiers may be grouped such that they are displayed to the user in sections corresponding to their associated categories.

Figure 4:
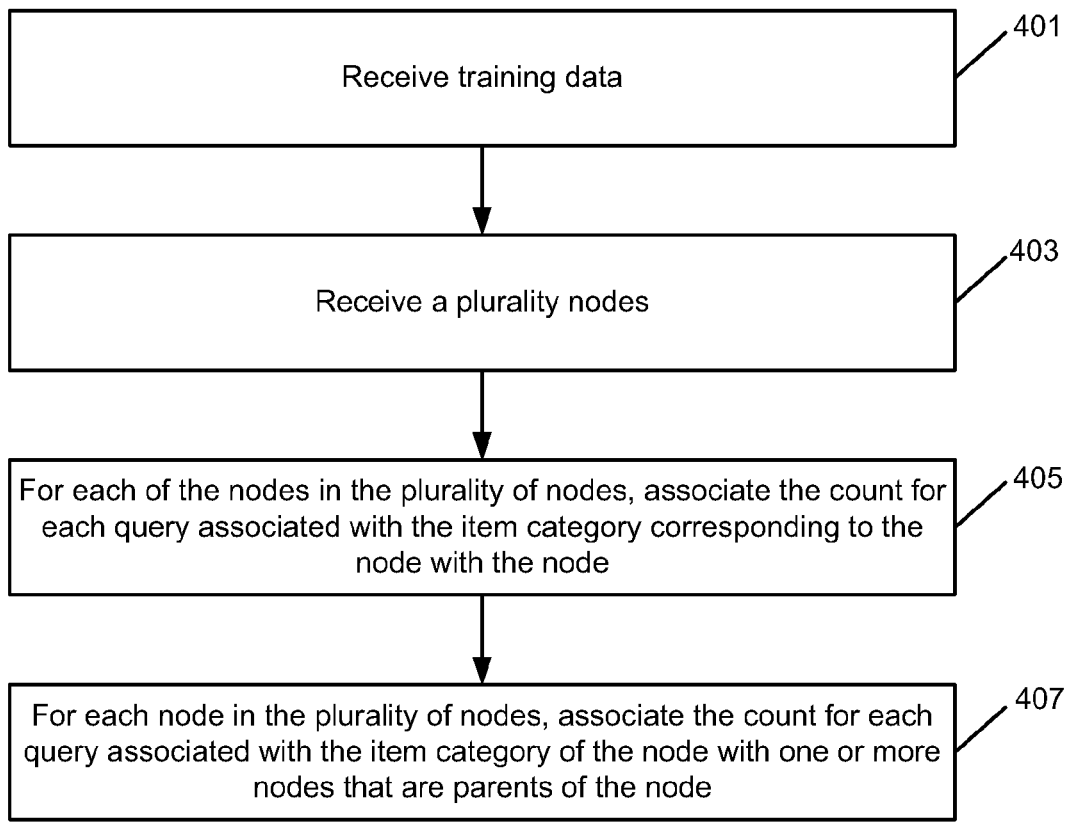
FIG. 4 is an operational flow of an implementation of a method for combining training data with a plurality of nodes.

FIG. 4 is an operational flow of an implementation of a method 400 for combining the training data with the plurality of nodes. The method 400 may be implemented by the provider 140, for example.

Training data is received at 401. The training data may be received by the trainer 145 of the provider 140. In some implementations, the training data may include a plurality of tuples with each tuple comprising an item category, a query, and/or a count for the query. The tuples may have been obtained using manual labeling or generated automatically from search or query logs.

A plurality of nodes is received at 403. The plurality of nodes may be received by the trainer 145 of the provider 140 from the item category data 160. The plurality of nodes may represent the hierarchy of item categories and may include a node for each of the item categories. In some implementations, the nodes may be either child nodes, parent nodes, or both. The item category associated with a child node is a sub-category of item category associated with its parent node.

For each of the nodes in the plurality of nodes, the count for each query associated with the item category corresponding to the node is associated with the node at 405. The item category may be associated with the node by the trainer 145 of the provider 140.

For each of the nodes in the plurality of nodes, the count for each query associated with the item category of the node is associated with one or more nodes that are parents of the node at 407. The count may be associated with the parent nodes by the trainer 145 of the provider 140.

Figure 5:
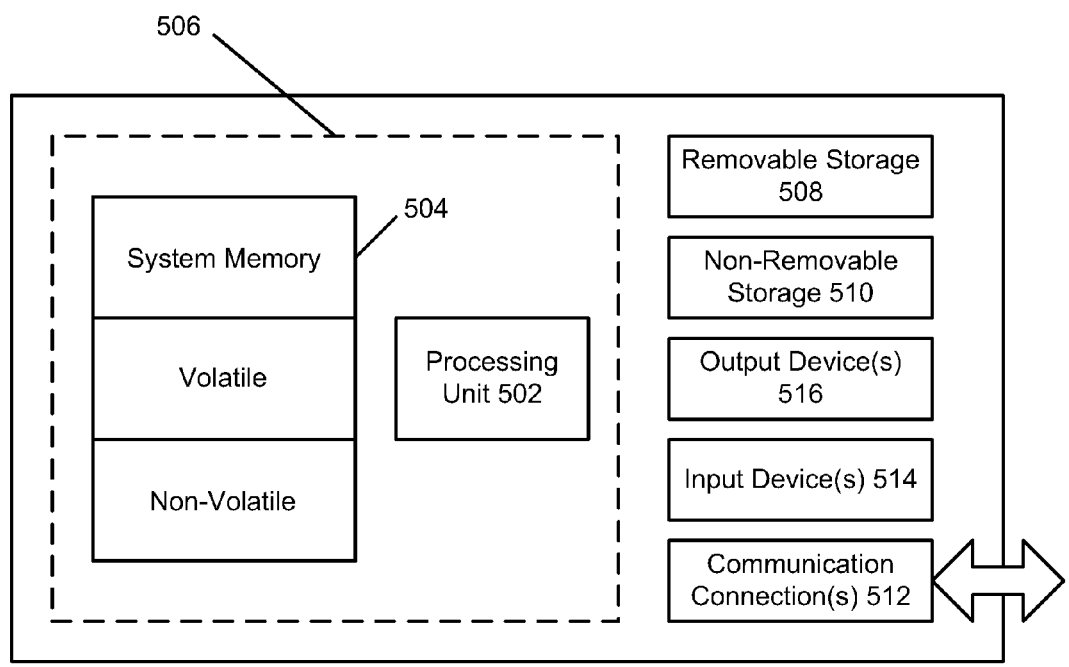
FIG. 5 is a block diagram of a computing system environment according to an implementation of the provide system.

FIG. 5 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing system 500. In its most basic configuration, computing system 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 506.

Computing system 500 may have additional features/functionality. For example, computing system 500 may include additional storage (removable and/or non-removable) including, but not limited to, magnetic or optical disks or tape. Such additional storage is illustrated in FIG. 5 by removable storage 508 and non-removable storage 510.

Computing system 500 typically includes a variety of computer readable media. Computer readable media can be any available media that can be accessed by computing system 500 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system 500. Any such computer storage media may be part of computing system 500.

Computing system 500 may contain communications connection(s) 512 that allow the device to communicate with other devices. Computing system 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
receiving item category data by a computing device, wherein the item category data comprises a plurality of nodes and each node is associated with an item category of a plurality of item categories;
receiving a plurality of queries by the computing device;
for each query of the plurality of queries, providing an indicator of one or more items that are responsive to the query of a plurality of items by the computing device, wherein the plurality of items comprise at least one of products or services;
for each query of the plurality of queries, receiving a selection of an item indicated by the provided indicator of one or more items by the computing device;
receiving item data that associates an item category of the plurality of item categories with each item of the plurality of items by the computing device;
based on the selected item for each query of the plurality of queries and the item category associated with each item, generating training data by the computing device, wherein the training data comprises a mapping of queries to item categories;
for each query and item category in the mapping, determining a count of the number of times that the item category is associated with the query in the mapping by the computing device;
combining the training data and item category data by, for each determined count for each item category, associating the determined count with the node of the plurality of nodes associated with the item category by the computing device;
receiving another query by the computing device;
receiving a classifier by the computing device, wherein the classifier, when applied to a node of the plurality of nodes using the received query by the computing device, results in a generated probability that the received query is intended for the item category associated with the node;
applying the classifier to the plurality of nodes using the received query by the computing device until a generated probability for a node is below a threshold probability resulting in a list of item categories and a generated probability for each item category;
ranking the item categories in the list of item categories based on the generated probabilities by the computing device; and
providing the item categories in a ranked order by the computing device through a network.

2. The method of claim 1, further comprising:
determining a highest ranked item category from the ranked item categories;
determining items of the plurality of items that match the another query;
determining one or more items of the matching items that are associated with the highest ranked item category; and
providing indicators of the determined one or more items.

3. The method of claim 1, further comprising:
determining a subset of the ranked item categories;
determining one or more items responsive to the received query that are associated with the item categories of the subset of ranked item categories; and
providing indicators of the determined one or more items.

4. The method of claim 3, further comprising providing the indicators of the determined one or more items grouped by the item categories associated with their indicated items.

5. The method of claim 1, wherein the classifier is a Bayesian classifier.

6. The method of claim 1, wherein the classifier generates a probability that the received query is intended for an item category associated with the node of the plurality of nodes by determining the count associated with the node for the received query and generating the probability using the determined count.

7. The method of claim 1, further comprising setting the threshold probability by the computing device responsive to an input value.

8. A method comprising:
receiving a search log by a computing device, wherein the search log comprises a plurality of queries and, for each query, an item of a plurality of items that was selected after the query was submitted, wherein the plurality of items comprise at least one of products or services;
receiving item data that associates an item category of a plurality of item categories with each item of the plurality of items by the computing device;
generating training data from the search log and the item data by the computing device, wherein generating the training data comprises:
for each query of the search log and each item category of the training data, generating a count of a number of times that an item associated with the item category was selected after the query was submitted;
receiving item category data by the computing device, wherein the item category data comprises a plurality of nodes comprising a node for each item category, and further wherein each node in the plurality of nodes is a child of another node, a parent of another node, or both; and
combining the training data and the item category data by:
for each of the nodes in the plurality of nodes, associating the count for each query associated with the item category of the node with the node by the computing device; and
for each of the nodes in plurality of nodes, associating the count for each query associated with the item category of the node with one or more nodes that are parents of the node by the computing device.

9. The method of claim 8, further comprising:
receiving a threshold probability;
receiving another query;
receiving a classifier, wherein the classifier, when applied to a node of plurality of nodes using the received query, results in a generated probability that the received query is intended for an item category associated with the node;
recursively applying the classifier to the plurality of nodes using the received query until a generated probability for a node is below the received threshold probability resulting in list of item categories and a generated probability for each item category;
ranking the item categories in the list of item categories based on the generated probabilities; and
providing the item categories in a ranked order.

10. The method of claim 9, further comprising:
determining a highest ranked item category;
determining one or more items responsive to the received query that are associated with the highest ranked item category; and
providing indicators of the determined one or more items.

11. The method of claim 9, further comprising:
determining a subset of the ranked item categories;
determining one or more items responsive to the received query that are associated with the item categories of the subset of ranked item categories; and
providing indicators of the determined one or more items.

12. The method of claim 11, further comprising providing the indicators of the determined one or more items grouped by the item categories associated with their indicated items.

13. The method of claim 9, wherein the classifier is a Bayesian classifier.

14. The method of claim 9, wherein the classifier generates a probability that the received query is intended for an item category associated with the node of the plurality of nodes by determining the count associated with the node for the received query and generating the probability using the determined count.

15. A system comprising:
at least one computing device; and
a provider that:
 receives item category data, wherein the item category data comprises a plurality of nodes and each node is associated with an item category of a plurality of item categories;
 receives a plurality of queries;
 for each query of the plurality of queries, provides an indicator of one or more items that are responsive to the query of a plurality of items, wherein the plurality of items comprise at least one of products or services;
 for each query of the plurality of queries, receives a selection of an item indicated by the provided indicator of one or more items;
 receives item data that associates an item category of a plurality of item categories with each item of the plurality of items;
 based on the item selected for each query of the plurality of queries and the item category associated with each item, generates training data, wherein the training data comprises a mapping of queries to item categories;
 for each query and item category in the mapping, determines a count of the number of times that the item category is associated with the query in the mapping;
 combine the training data and item category data by, for each determined count for each item category, associating the determined count with the node of the plurality of nodes associated with the item category;
 receives another query;
 receives a classifier, wherein the classifier, when applied to a node of plurality of nodes using the received query by the provider, results in a generated probability that the received query is intended for the item category associated with the node;
 applies the classifier to the plurality of nodes using the received query until a generated probability for a node is below a threshold probability resulting in list of item categories and a generated probability for each item category;
 ranks the item categories in the list of item categories based on the generated probabilities and a popularity associated with each item category; and
 provides the item categories in a ranked order.

16. The system of claim 15, wherein the provider further:
determines the highest ranked item category;
determines one or more items responsive to the received query that are associated with the highest ranked item category; and
provides indicators of the determined one or more items.

17. The system of claim 15, wherein the provider further determines the threshold probability.

18. The system of claim 15, wherein the provider further:
determines a subset of the ranked item categories;
determines one or more items responsive to the received query that are associated with the item categories of the subset of ranked item categories; and
provides indicators of the determined one or more items.

19. The system of claim 18, wherein the provider further provides the determined one or more items grouped by the item categories associated with their indicated items.

20. The system of claim 15, wherein the provider further adjusts the threshold probability to increase the precision of the ranked item categories or to provide more specific item categories.

* * * * *